United States Patent [19]

Jones

[11] Patent Number: 5,269,396
[45] Date of Patent: Dec. 14, 1993

[54] BRAKE ASSEMBLY BACKING MEANS

[75] Inventor: Henry J. Jones, Sparta, Canada

[73] Assignee: Jones Brake Technologies, Inc., Ontario, Canada

[21] Appl. No.: 871,838

[22] Filed: Apr. 20, 1992

Related U.S. Application Data

[63] Continuation-in-part of Ser. No. 710,456, Jun. 5, 1991, abandoned.

[30] Foreign Application Priority Data

Feb. 28, 1991 [CA] Canada ................... 2037336

[51] Int. Cl.$^5$ ............................................. F16D 65/09
[52] U.S. Cl. ........................................ 188/234; 188/335
[58] Field of Search .................. 188/18 R, 78, 206 A, 188/234, 340, 341, 328, 325

[56] References Cited

U.S. PATENT DOCUMENTS

| | | | |
|---|---|---|---|
| 3,216,532 | 11/1965 | Erickson et al. | 188/342 |
| 3,279,568 | 10/1966 | Papin | 188/206 A |
| 3,548,976 | 12/1970 | Dombeck | 188/340 |
| 3,576,237 | 4/1971 | Dubuc | 188/206 A |
| 4,061,429 | 12/1977 | Mathues | 188/341 |
| 4,182,439 | 1/1980 | Kluger et al. | 188/364 |
| 4,452,347 | 1/1984 | Dozier | 188/18 R |
| 4,553,647 | 11/1985 | Spaargaren | 188/340 |

FOREIGN PATENT DOCUMENTS

| | | |
|---|---|---|
| 651363 | 10/1962 | Canada . |
| 1075176 | 4/1980 | Canada . |
| 1080138 | 6/1980 | Canada . |
| 1105856 | 7/1981 | Canada . |

Primary Examiner—Matthew C. Graham
Assistant Examiner—Chris Schwartz
Attorney, Agent, or Firm—Krass & Young

[57] ABSTRACT

There is disclosed a two-piece brake backing plate for the attachment of drum brake components thereto. The main plate includes an open channel extending from the axle opening, to the rim thereof, for receiving the axle of a vehicle. A separate cover plate is provided which is releasably engagable with the main plate and further which overlies at least a portion of the channel. The open channel permits radial replacement of the plate to a vehicle axle housing and axle housing support flange while the axle is in situ.

17 Claims, 7 Drawing Sheets

PRIOR ART

PRIOR ART

FIG.5
FIG.5A
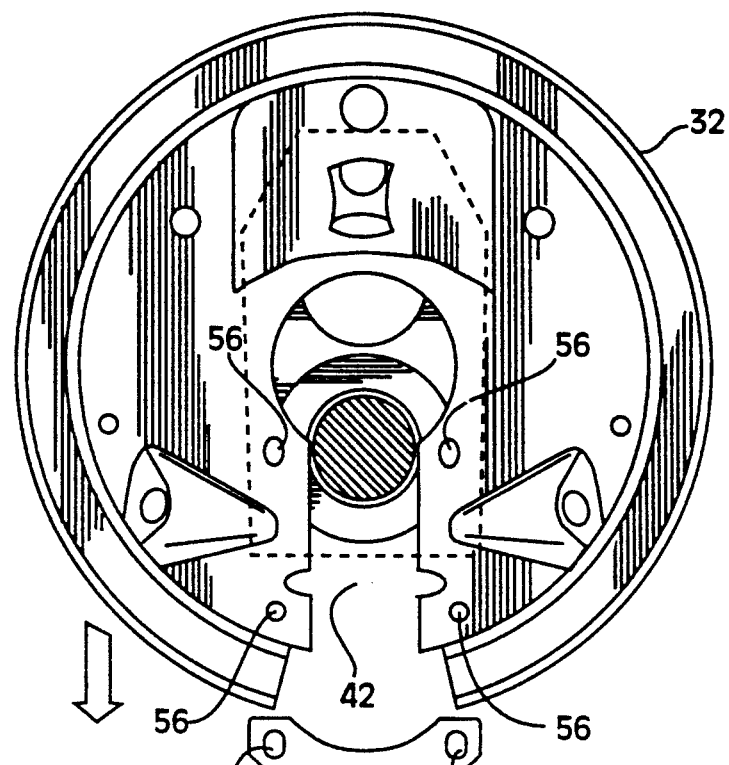
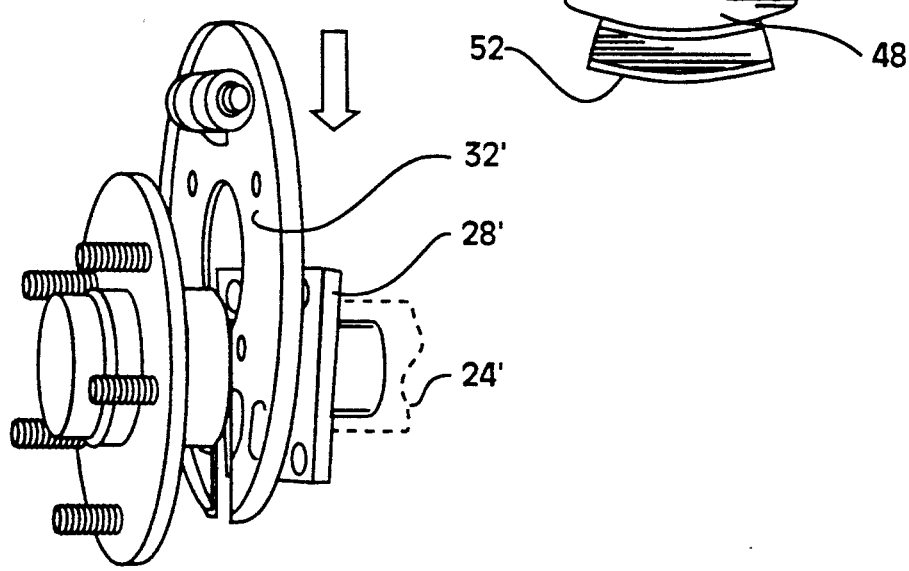

BRAKE ASSEMBLY BACKING MEANS

REFERENCE TO RELATED APPLICATIONS

This application is a continuation-in-part of my co-pending application Ser. No. 07/710,456 filed Jun. 5, 1991, now abandoned.

FIELD OF THE INVENTION

The present invention relates to improvements in wheel brake assemblies and, more particularly, it relates to improved brake backing plate assemblies for drum brake arrangements in vehicles.

BACKGROUND OF THE INVENTION

Generally, brake backing plates for mounting and supporting drum brake components are well known in the art. Typically known arrangements provide a unitary backing plate with an axle receiving opening for axially mounting the plate onto the axle housing support flange of a vehicle. Once the brake components, all commonly known in the art, are positioned and mounted, these typical backing plates may only be replaced by labour intensive disassembly of the rear wheel components of the vehicle, including removal of the axle shaft. Removal of the damaged backing plate from the axle support flange is accomplished by means of unbolting, or other methods well known in the art, but regardless of the precise technique used the axle shaft must still be removed in order to install the replacement unitary brake backing plate.

The known prior art reflects the above mentioned unitary brake backing plates. Common examples of unitary plates are those manufactured as described in the Mathues U.S. Pat. No. 4,061,429, as a single or one-piece circular brake plate, (resembling a large washer), the centre hole being the axle receiving opening. Another example is that shown in the Dubuc U.S. Pat. No. 3,576,237, that is manufactured as described in the patent, as having an inner member and two outer allochiral portions (mirror images) that are assembled by welding the three pieces together, or employing one of numerous other conventional fastening techniques, therefore effectively providing a one-piece or unitary brake backing plate at the manufacturer's level. Regardless of the allochiral outer members, the inner member fully encloses the axle receiving opening, thereby necessitating the removal of the vehicle axle shaft for purpose of replacement of the brake backing plate.

Generally speaking, both of the prior Mathues and Dubuc backing plates discussed herein can only be axially mounted onto the axle housing support flange of a vehicle after the axle shaft has been removed.

Other background patent documents which illustrate the prior art techniques include Canadian patents 1,075,176; 1,080,138; 651,363; 1,105,856; and U.S. Pat. Nos. 3,548,976; 4,337,851; 4,452,347; 3,279,568; and 3,216,532.

Although the patent references described and noted above relate to brake supporting structures, none discloses a brake backing assembly which facilitates radial replacement onto the axle housing support flange of a vehicle while the axle shaft is in situ.

Accordingly, there is a distinct need for a brake backing assembly which facilitates rapid replacement onto a vehicle without the disadvantage of having to extensively disassemble the components of a rear wheel including removal of the axle shaft. Having regard to this need, the present invention satisfies the same by providing a novel brake backing assembly which may be radially replaced as hereafter described thus obviating the extensive disassembly inherent with the prior art arrangements.

SUMMARY OF THE INVENTION

According to the invention in one aspect there is provided brake backing apparatus for mounting a drum brake assembly on a vehicle axle housing while the vehicle axle shaft remains in situ within the axle housing. The brake backing apparatus comprises a main backing plate having an axle receiving opening in an interior region thereof. An axle receiving open channel in said main backing plate communicates with the axle receiving opening and extends outwardly therefrom toward an outer peripheral portion of the main backing plate and terminates at an open entrance mouth leading into the channel. The channel is dimensioned and arranged to enable the main backing plate to be replaceable or mountable on the axle housing without the need to remove the vehicle axle shaft from the axle housing.

As a further feature, the main backing plate is adapted to be engaged with an axle housing support flange fixed to the axle housing. Furthermore, the main backing plate is adapted to co-operate with suitable fasteners to secure the main backing plate to said support flange.

Still further according to the invention, the above-noted channel has a width at least as great as the diameter of the axle shaft with which it is to be associated such that during replacement or mounting said main backing plate may be moved generally transversely of the axle shaft with the latter moving relative to the main backing plate from the open entrance mouth along said channel and into the axle receiving opening to a final position enabling attachment of the main backing plate to the axle housing support flange. The axle shaft remains in situ during this procedure.

The main backing plate is of course adapted to mount the usual brake components including a pair of brake shoes together with any conventional means for actuating the brake shoes.

The brake backing apparatus preferably further includes a cover plate which is releasably engaged with the main backing plate in overlying relation with at least a portion of said channel. The cover plate preferably includes an inner portion adapted to complement and complete said axle receiving opening when the cover plate is engaged with the main backing plate.

In a typical embodiment of the invention the main backing plate has a peripheral rim portion thereon and the cover plate has an outer portion adapted to co-operate and mate with the rim portion when engaged with the main backing plate.

A further aspect of the invention provides a drum brake assembly for a motor vehicle having an axle housing which mounts an axle shaft, the axle housing having a support flange fixed thereto. The drum brake assembly includes a main brake backing plate releasably secured to said support flange, the main backing plate having the important characteristics recited above.

A still further aspect of the invention provides a method of repairing a drum brake assembly of a vehicle wherein the brake assembly includes a main backing plate releasably attached to an axle housing support flange, the latter in turn being fixed to an axle housing having an axle shaft rotatably mounted therein. The method includes the following steps:

(a) providing a main backing plate having an axle receiving opening in an interior region thereof, and an axle receiving open channel in said main backing plate communicating with the axle receiving opening and extending outwardly therefrom toward an outer peripheral portion of the main backing plate and terminating at an open entrance mouth leading into said channel, (b) moving said main backing plate generally transversely of the axle shaft such that the latter enters said channel entrance mouth and moves relatively thereto along the channel into the axle receiving opening, (c) bringing the main backing plate into engagement with said support flange and securing the main backing plate thereto.

As a further feature of the invention the method includes the step of attaching a cover plate to the main backing plate in overlying relation to the channel.

Having thus generally described the invention, reference will now be made to the accompanying drawings, illustrating preferred embodiments.

BRIEF DESCRIPTION OF THE DRAWINGS

FIG. 5 is an exploded elevation view similar to FIG. 4 but in a more advanced mounting stage;

FIG. 5A is a view similar to FIG. 4A but in a more advanced mounting stage;

DETAILED DESCRIPTION OF THE PREFERRED EMBODIMENTS

Figure 1:
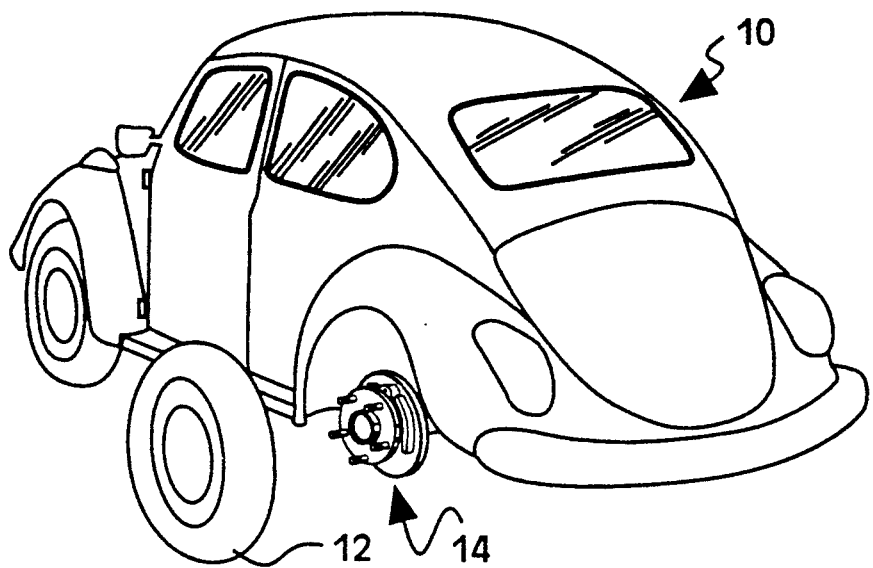
FIG. 1 is a perspective view of a vehicle and a rear wheel braking assembly thereof.

Referring now to the drawings, FIG. 1 illustrates a perspective view of a vehicle 10 with a rear wheel 12 (in exploded view) to show the rear braking assembly indicated generally by reference numeral 14.

Figure 2:
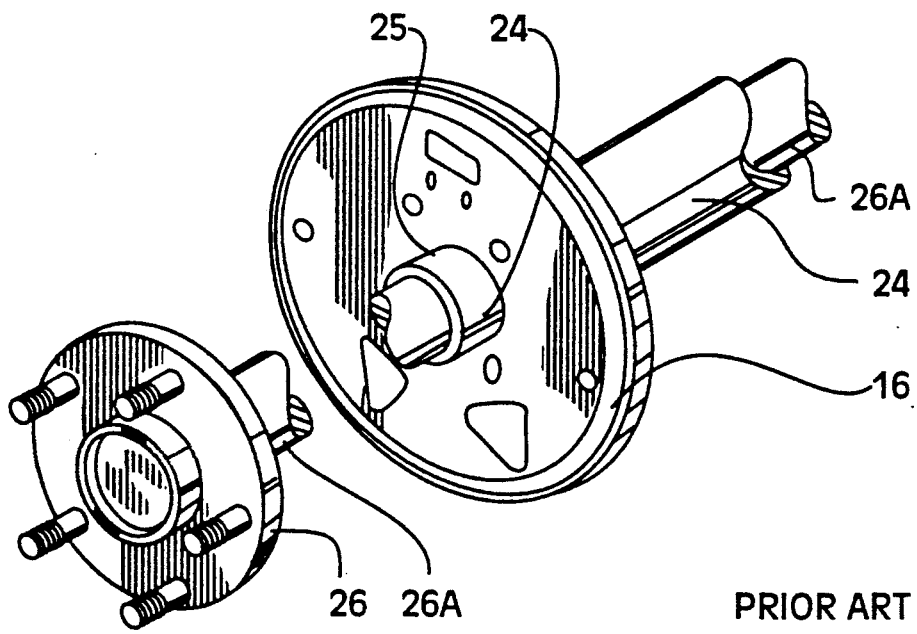
FIG. 2 is an enlarged perspective view of a prior art backing plate mounted on an axle housing.

In FIG. 2, a portion of a prior art braking assembly is shown in perspective, incorporating a unitary backing plate 16 such as those known in the prior art. FIG. 2 shows axle shaft 26A mounted within the axle housing 24. Typical brake components such as a hydraulic cylinder, anchor pin and mounting, hydraulic fluid lines, brake shoes and axle housing support flange are not shown in FIG. 2.

Figure 3:
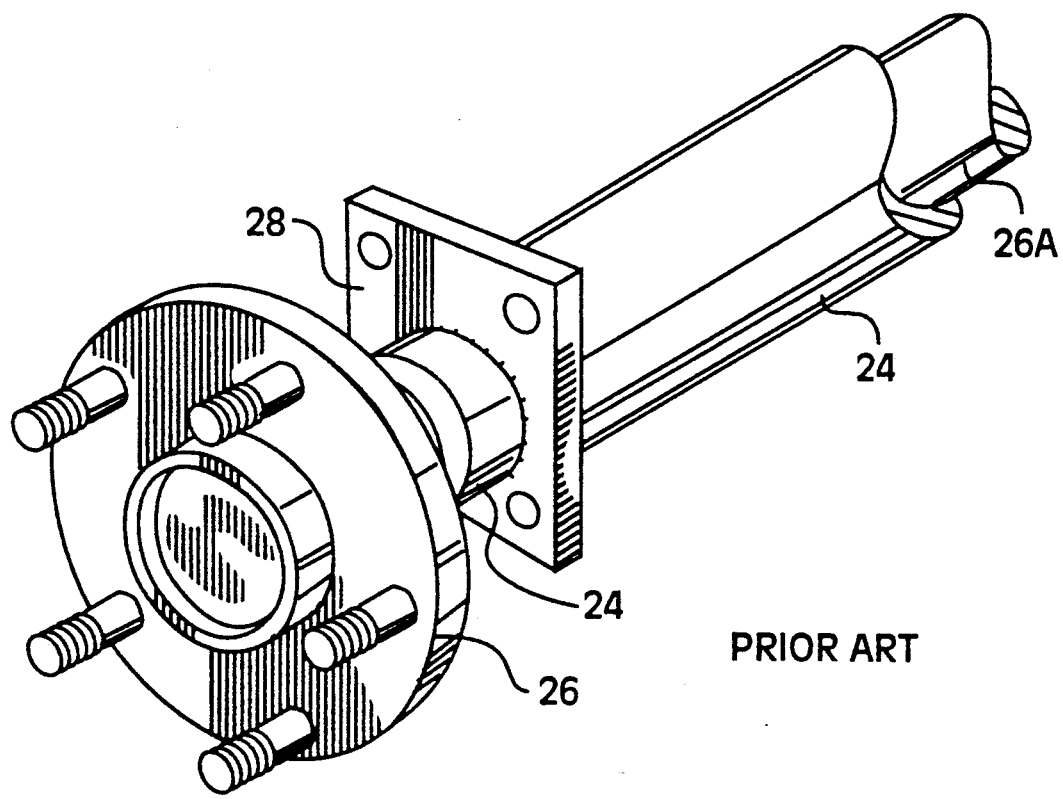
FIG. 3 is a perspective view of a typical vehicle axle assembly including the axle shaft, the axle housing and axle housing support flange.

The conventional backing plate 16 illustrated is axially positioned on the axle housing 24 via axle housing opening 25 adjacent the axle shaft 26A which is rotatably received therein. The brake backing plate 16 is then fixedly secured thereto by bolting to an axle housing support flange 28 (FIG. 3) which is fixed to the axle housing as by welding.

Having regard to the description of the prior art arrangement, obvious limitations become apparent. A chief limitation with respect to the above arrangement is the fact that when one attempts to remove the installed plate 16 for replacement with an operational plate, its removal from the axle housing 24 can only be accomplished by removing the entire axle shaft 26A and all of the ancillary braking equipment from the brake backing plate. This is a time consuming and often difficult procedure. Clearly, therefore, one can see the excessive amount of labour required in this type of repair to the braking system particularly as it relates to the removal of the axle shaft.

Figure 4:
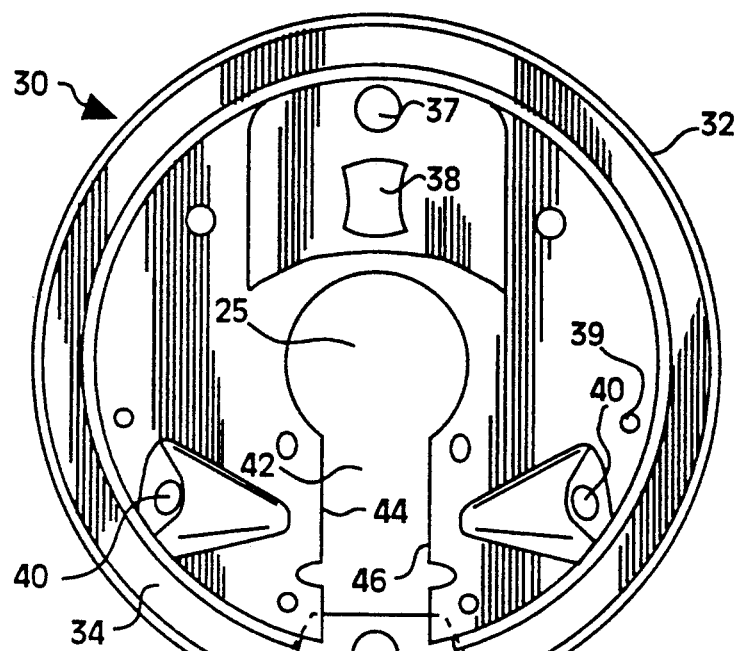
FIG. 4 is an exploded elevation view of a brake backing plate assembly according to the invention in a pre-mounting stage.
Figure 4A:
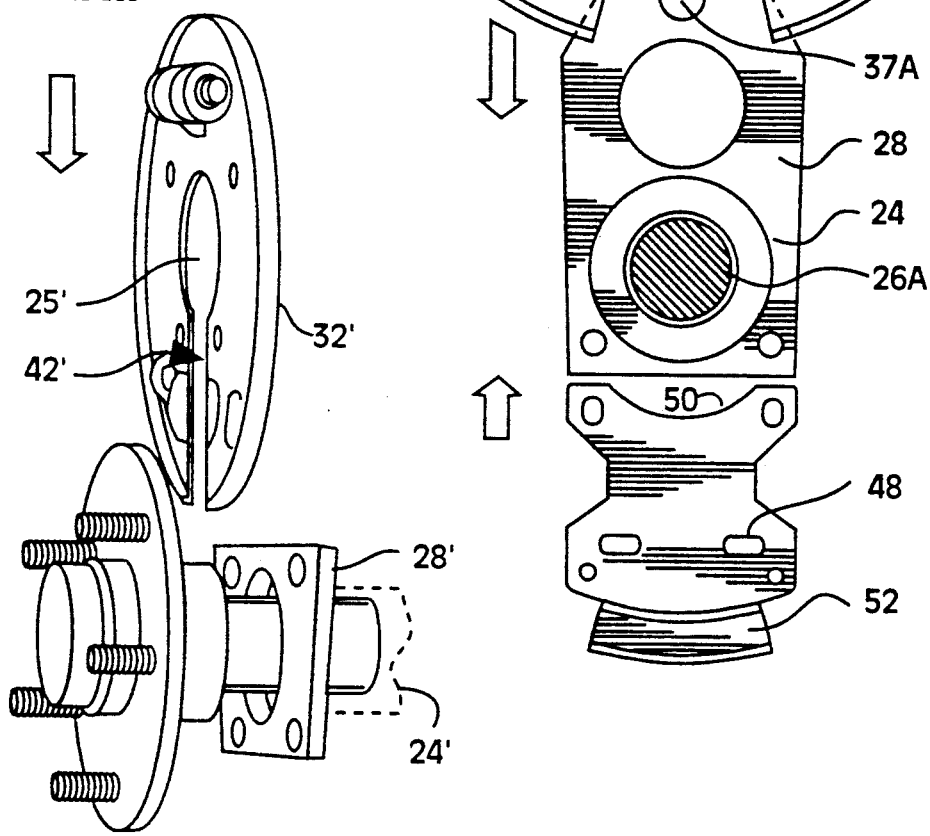
FIG. 4A is a perspective view of a brake backing assembly similar to that of FIG. 4 but with a slightly modified backing plate and axle housing support flange.
Figure 4B:
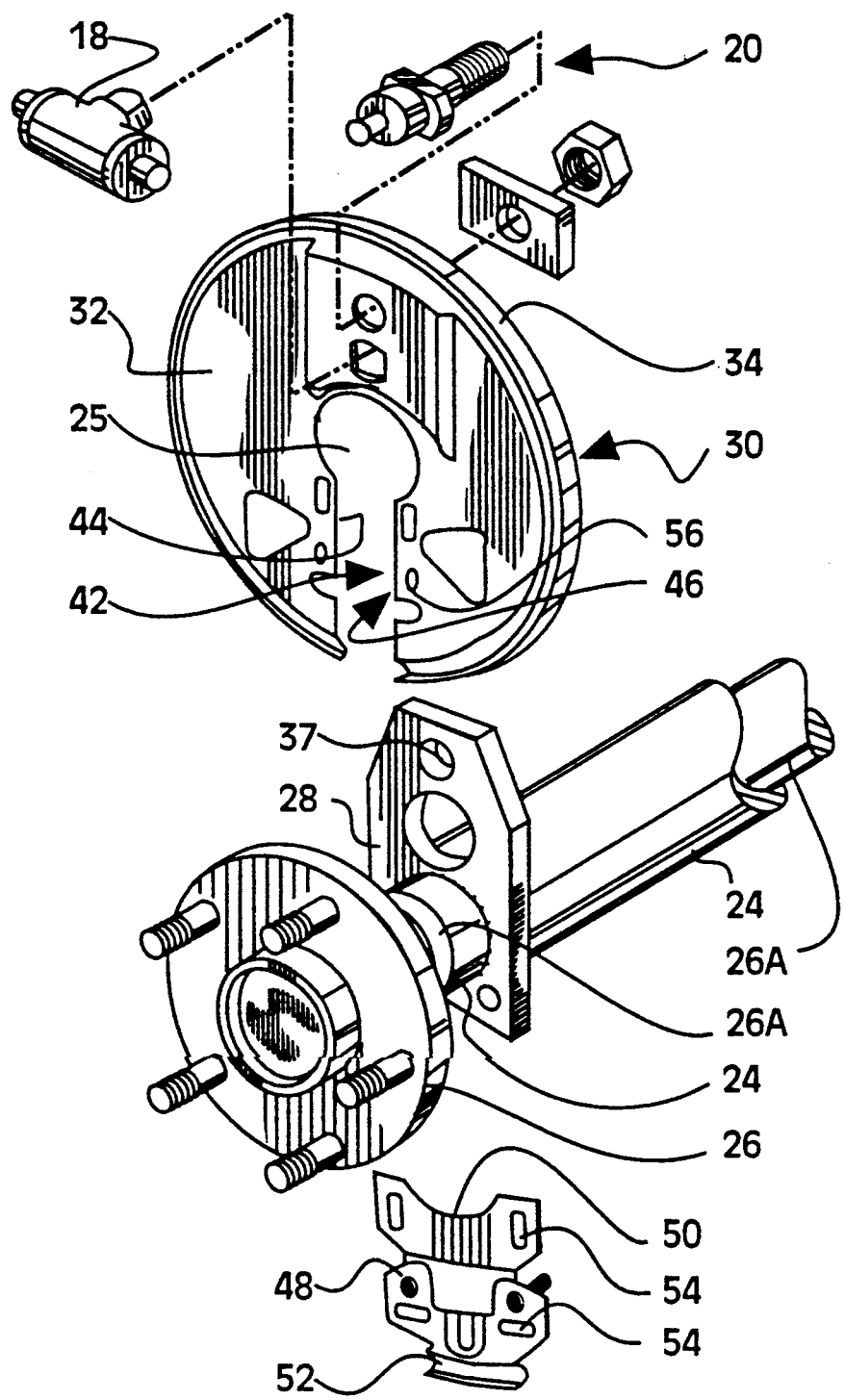
FIG. 4B is an exploded perspective view of the assembly of FIG. 4 again with slightly modified backing plate and cover plate.
Figure 6:
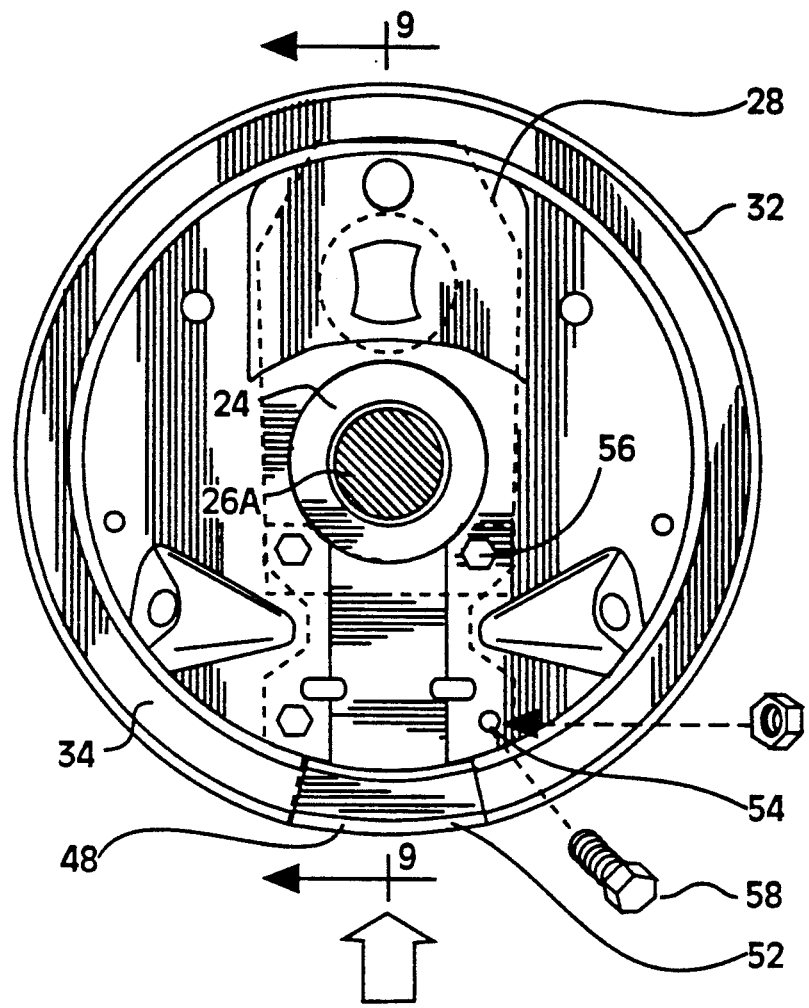
FIG. 6 is a side elevation view of a backing plate assembly according to the present invention when positioned about the axle shaft and axle housing of a vehicle.
Figure 6A:
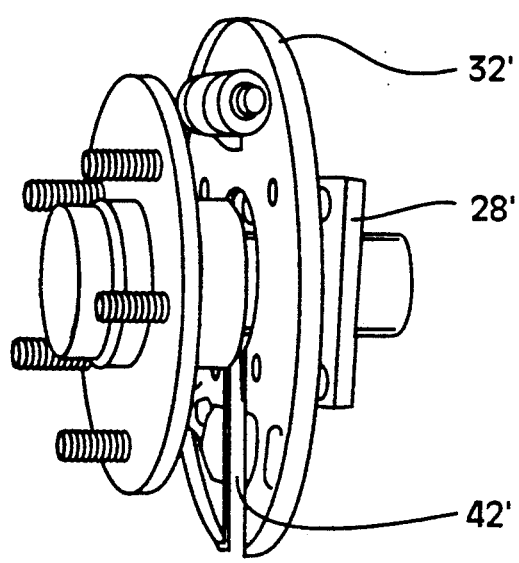
FIG. 6A is a perspective view of a slightly modified backing plate assembly as positioned about the axle shaft and axle housing of a vehicle.
Figure 7:
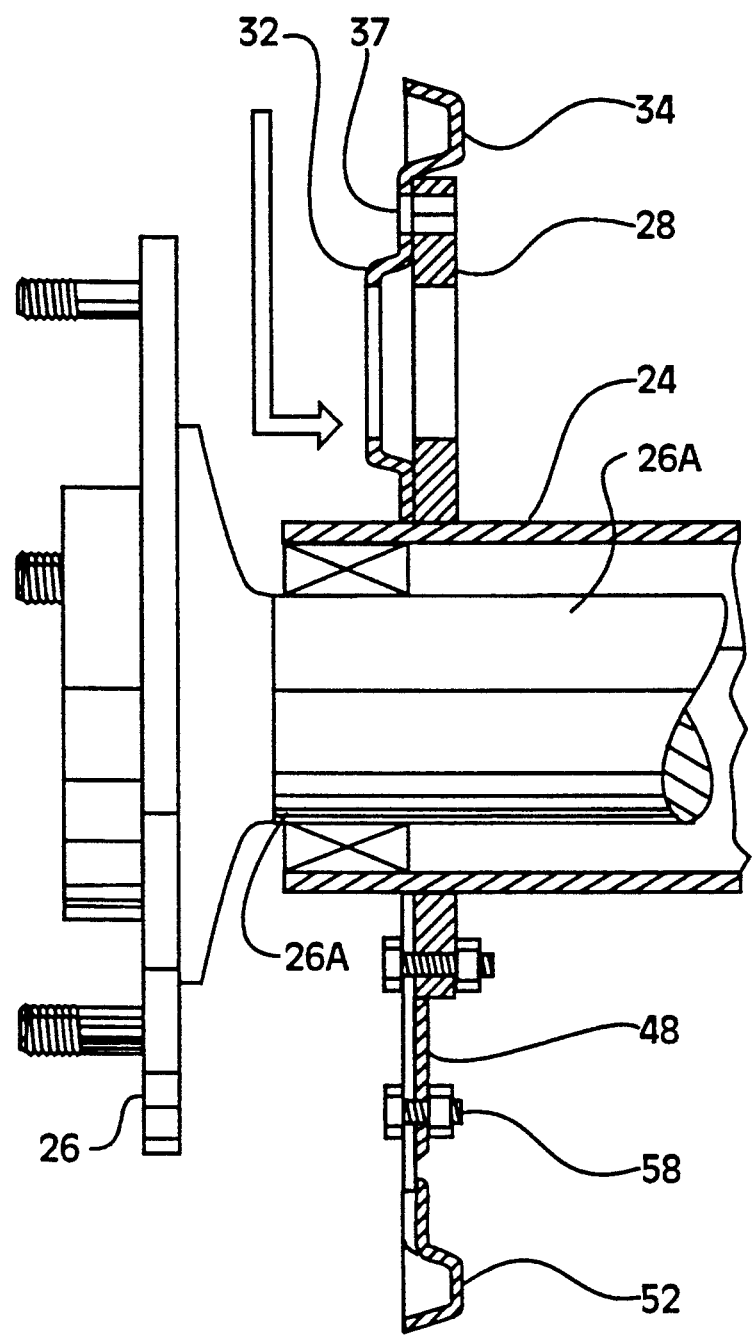
FIG. 7 is a side elevational view of the backing plate assembly as mounted about a vehicle axle housing to the axle housing support flange.

With the present invention there is provided a system which overcomes the above difficulties of removing the axle shaft by providing a backing plate assembly, as illustrated in FIGS. 4-7, and indicated generally by reference numeral 30. Assembly 30 includes a modified main backing plate 32 and a cover plate member 48 described in greater detail hereinafter. FIGS. 4A and 5A show slightly modified backing plates and these are identified in the drawings as reference 32'. However, the differences are so slight that with a few exceptions, the reference 32 will be used to denote all the backing plates. The main backing plate 32, shown in the drawings, is typically a one-piece stamped metal plate including a peripheral rim 34 relieved from the planar surface of the plate 32. The plate 32 may also be stamped according to techniques known to those skilled in the art to include a plurality of apertures 37 through 40 to mount the ancillary braking components e.g. brake shoes, anchor pin(s) 20, hydraulic wheel cylinders 18, etc. (some of which are illustrated in FIG. 4B). The main backing plate 32 includes an open channel 42 extending radially from the axle receiving opening 25 to an open mouth at the rim 34 of the main backing plate to provide an entrance opening to mount main backing plate 32 radially onto the axle housing 24. The open channel 42 is defined by parallel spaced apart sides 44 and 46.

The open channel 42 has a width slightly larger than the diameter of the axle shaft 26A to permit the radial mounting with axle shaft 26A in situ. Axle receiving opening 25 is sized to fit onto the outer end of the axle housing to assist in retaining the plate 32 about the axle housing 24. (In the modified version of FIGS. 4A and 5A the axle flange 28' is fixed to the extreme outer end of axle housing 24'. In this case the axle receiving opening 25' is desirably made sufficiently large as to permit insertion or extraction of the outer axle shaft bearing (not shown) which seats in the extreme outer end of the axle housing 24'.) Further, the open channel 42 can be located in any desired angular position around the 360° extent of plate 32 in order to adapt to any drum brake components or axle flange configuration that may from time to time become available.

The channel may be formed in the main backing plate 32 during a stamping procedure, or alternatively, may be subsequently formed therein by suitable machining.

In order to complete the main backing plate 32, and facilitate easy assembly to the axle housing support flange 28 during a repair procedure, there is provided a cover plate 48 for releasable engagement with the main backing plate 32; in the embodiment shown, cover plate 48 is formed so as to provide a cooperative, overlying relationship with channel 42 and rim 34. Also, the arcuate portion 50 of cover plate 48 is positioned as to complete the full axle receiving opening 25 in main backing plate 32.

Cover plate 48 may typically be made of a material similar to that of the main backing plate 32, and may be likewise produced by stamping, or machining. Cover plate 48 is shaped to avoid interference with conventional braking components normally mounted on main backing plate 32.

Referring now to FIGS. 4, 4B, 5 and 6, there is illustrated a sequence of drawings illustrating the mounting of the main backing plate 32 over the axle shaft 26A and to an axle housing 24. The main backing plate 32 is radially mounted, i.e. moved into position in a radial direction over the axle shaft 26A. As shown, the main backing plate 32 is moved radially in a plane transverse to the axle shaft 26A such that the latter enters the mouth of the channel 42 and moves relatively thereto along the channel into a position centered within the axle recovering opening 25. Main backing plate 32 is then shifted into position such that the outer end of axle housing 24 enters the axle receiving opening 25, following which the main plate 32 is attached to the axle housing support flange 28 all while the axle shaft 26A is in situ. Once positioned as described above, the main backing plate 32 is secured to the support flange 28 with aperture 37 aligned with a registering aperture 37A on support flange 28. An anchor pin, indicated by reference numeral 20 (FIG. 4B) which extends through these apertures releasably secures the main backing plate 32 to axle housing support flange 28. After this step is completed, the cover plate 48 can be placed in position relative to the main backing plate 32 in overlying relation to channel 42, with the arcuate portion 50 of cover plate 48 abutting the axle housing 24 and arcuate rim 52 in mating relationship with rim 34 of main backing plate 32. Apertures 54 and 56, provided on the cover plate 48 and main backing plate 32, register in alignment and facilitate via fasteners such as nuts and bolts, the releasable engagement of cover plate 48 with main backing plate 32 thus providing a complete brake backing structure.

In the modified versions of FIGS. 4A and 5A the procedure described above is used except that when the main backing plate 32 has been fully inserted radially, it only needs to be bolted on to the face of the axle housing support flange 28', i.e. the outer end of the axle housing 24' does not enter into the axle receiving opening 25 as noted previously.

Further, the main backing plate 32 may be releasably secured to the axle housing support flange 28 via the usual fasteners without the use of the cover plate 48. Such an arrangement is possible where the main backing plate 32 in itself provides adequate area for the mounting of the braking components.

Further, the cover plate 48 may completely overlie channel 42 as illustrated, or it may function equally well if it is modified to cover only a portion of the length of the channel 42. This will vary depending upon the specific structure of the backing plate components and requirements for their mounting.

In a further alternative, the cover plate 48 may be pivotally and releasably connected to the main backing plate 32 so that it may be swung transversely out of engagement with the main backing plate 32.

In the embodiments described above, expedited replacement of the main backing plate 32 or components mounted thereto, can thus be achieved. The ability to effect backing plate replacement with the axle shaft in situ is an enormous time-saver.

Although specific embodiments have been described, it will be understood that various modifications can be made to the disclosed embodiments without departing from the spirit and scope of the invention.

I claim:

1. A brake backing apparatus for mounting a drum brake assembly on a vehicle axle housing while the vehicle axle shaft remains in situ within the axle housing, said brake backing apparatus comprising a generally planar main backing plate having a generally circular configuration and including an axle receiving opening in a central region thereof, and an axle receiving open channel in said main backing plate communicating with the axle receiving opening, extending radially outwardly therefrom toward an outer peripheral portion of the generally circular main backing plate, terminating at an open entrance mouth at the generally circular outer periphery of the plate leading into said channel, and having a width less than the diameter of the axle receiving opening but at least as great as the diameter of the axle shaft, said channel being dimensioned and arranged to enable the main backing plate to be replaceable or mountable on the axle housing without removing the vehicle axle shaft from the axle housing.

2. The brake backing apparatus of claim 1 wherein said main backing plate is adapted to be engaged with an axle housing support flange fixed to the axle housing.

3. The brake backing apparatus of claim 2 wherein said main backing plate is adapted to co-operate with fasteners to secure the main backing plate to said support flange.

4. The brake backing apparatus of claim 1 further comprising a cover plate which is releasably engaged with the main backing plate in covering relation with at least a portion of said channel.

5. The brake backing apparatus of claim 4 wherein said main backing plate has an arcuate peripheral rim portion and said cover plate has an arcuate outer rim portion adapted to cooperate and mate with said arcuate plate rim portion when engaged with the main backing plate.

6. The brake backing apparatus of claim 5 wherein said main backing plate is adapted to mount a pair of brake shoes together with a means for actuating the brake shoes.

7. The brake backing apparatus of claim 4 wherein said cover plate includes an arcuate inner portion adapted to complement and complete said axle receiving opening when the cover plate is engaged with the main backing plate.

8. The brake backing apparatus of claim 1 wherein said main backing plate is adapted to mount a pair of brake shoes together with a means for actuating the brake shoes.

9. In a drum brake assembly for a motor vehicle having an axle housing which mounts an axle shaft, the axle housing having a support flange fixed thereto; the improvement comprising a main brake backing plate releasably secured to said support flange, the main backing plate having a generally circular configuration and including a central opening concentric with the outer periphery of the plate and sized to receive the axle housing and an axle receiving open channel in said main backing plate communicating with the axle receiving opening and extending radially outwardly therefrom toward an outer peripheral portion of the generally circular main backing plate and terminating at an open entrance mouth at the generally circular outer periphery of the plate leading into said channel, said channel having a width less than the diameter of said central opening but at least as great as the diameter of the axle shaft, said central opening and channel coacting to enable the backing plate to be replaceable or mountable on the support flange without removing the vehicle axle shaft from the axle housing.

10. The improvement according to claim 9 further comprising a cover plate which is releasably engaged with the main backing plate in covering relation with at least a portion of said channel.

11. The improvement according to claim 10 wherein said cover plate includes an inner arcuate portion adapted to complement and complete said axle receiving opening when the cover plate is engaged with the main backing plate.

12. The improvement according to claim 10 wherein said main backing plate has an arcuate peripheral rim portion and said cover plate has an arcuate outer rim portion adapted to cooperate and mate with said arcuate plate rim portion when engaged with the main backing plate.

13. A method of repairing a drum brake assembly of a vehicle wherein the brake assembly includes a main backing plate releasably attached to an axle housing support flange, the axle housing support flange in turn being fixed to an axle housing having an axle shaft rotatably mounted therein, the method comprising:
 providing a main backing plate having a generally circular configuration and including an axle housing receiving opening in a central region thereof, and an axle receiving open channel in said main backing plate communicating with the axle receiving opening, extending radially outwardly therefrom toward an outer peripheral portion of the main backing plate, terminating at an open entrance mouth at the circular outer periphery of the plate leading into said channel, and having a width less than the diameter of the axle housing receiving opening but at least as great as the diameter of the axle shaft,
 moving said main backing plate generally transversely of the axle shaft such that the axle shaft enters said channel entrance mouth and moves relative to said plate along the channel and into the axle housing receiving opening,
 moving said backing plate parallel to the axle shaft to move the axle receiving opening over the axle housing and bring the main backing plate into engagement with said support flange; and
 securing the main backing plate to said support flange.

14. The method of claim 13 further including attaching a cover plate to the main backing plate in overlying relation to the channel.

15. A method according to claim 13 wherein:
 said axle housing receiving opening has a diameter approximately the diameter of the axle housing;
 the support flange is spaced from an end of the axle housing to define an axle housing mounting portion between said support flange and said axle housing end;
 the axle shaft includes a portion extending outside of said axle housing beyond said one axle housing end; and
 the method comprises moving the backing plate transversely of the axle shaft and over said axle shaft portion and thereafter moving the backing plate parallel to the axle shaft to position the axle housing receiving opening over the axle housing mounting portion.

16. A brake backing apparatus for mounting a drum brake assembly on a vehicle axle housing while the vehicle axle shaft remains in situ within the axle housing, said brake backing apparatus comprising a main backing plate having a generally circular configuration and including an axle receiving opening in a central region thereof and an axle receiving open channel in said main backing plate communicating with the axle receiving opening and extending radially outwardly therefrom toward an outer peripheral portion of the generally circular main backing plate and terminating at an open entrance mouth at the generally circular outer periphery of the plate leading into said channel;
 said channel being dimensioned and arranged to enable the main backing plate to be replaceable or mountable on the axle housing without removing the vehicle axle shaft from the axle housing;
 the brake backing apparatus further comprising a cover plate which is releasably engaged with the main backing plate in covering relation with at least a portion of said channel, said main backing plate having an arcuate outer peripheral rim portion and said cover plate having an arcuate outer rim portion adapted to cooperate and mate with said arcuate plate rim portion when engaged with the main backing plate.

17. In a drum brake assembly for a motor vehicle having an axle housing which mounts an axle shaft, the axle housing having a support flange affixed thereto, the improvement comprising a main brake backing plate releasably secured to said support flange, the main backing plate having a generally circular configuration and including a central axle receiving opening concentric with the outer periphery of the plate through which said axle shaft projects, and an axle receiving open channel in said main backing plate communicating with the axle receiving opening and extending radially outwardly therefrom toward an outer peripheral portion of the generally circular main backing plate and terminating at an open entrance mouth at the generally circular outer periphery of the plate leading into said channel, said channel being dimensioned and arranged to enable the main backing plate to be replaceable or mountable on the support flange without removing the vehicle axle shaft from the axle housing, said improvement further comprising a cover plate which is releasably engaged with the main backing plate in covering relation with at least a portion of said channel, said main backing plate having an arcuate outer peripheral rim portion, and said cover plate having an arcuate outer rim portion adapted to cooperate and mate with said arcuate plate rim portion when engaged with the main backing plate.

* * * * *